(12) United States Patent
Kobayashi

(10) Patent No.: US 11,975,657 B2
(45) Date of Patent: May 7, 2024

(54) VEHICLE-MOUNTED DEVICE

(71) Applicant: SOCIONEXT INC., Kanagawa (JP)

(72) Inventor: Katsumi Kobayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 725 days.

(21) Appl. No.: 17/104,952

(22) Filed: Nov. 25, 2020

(65) Prior Publication Data

US 2021/0078502 A1 Mar. 18, 2021

Related U.S. Application Data

(63) Continuation of application No. PCT/JP2018/021009, filed on May 31, 2018.

(51) Int. Cl.
| | | |
|---|---|---|
| *B60R 11/02* | (2006.01) | |
| *B60R 16/027* | (2006.01) | |
| *B62D 1/04* | (2006.01) | |
| *B60R 11/00* | (2006.01) | |

(52) U.S. Cl.
CPC ........ *B60R 11/0217* (2013.01); *B60R 16/027* (2013.01); *B62D 1/046* (2013.01); *B60R 2011/001* (2013.01)

(58) Field of Classification Search
CPC ........ B60K 2370/128; B60K 2370/157; B60K 2370/782; B60K 35/00; B60Q 5/00; B60R 11/0217; B60R 16/027; B60R 2011/001; B62D 1/046; H04R 1/02
See application file for complete search history.

(56) References Cited

U.S. PATENT DOCUMENTS

| | | | |
|---|---|---|---|
| 6,108,416 A | 8/2000 | Collin et al. | |
| 2009/0189373 A1* | 7/2009 | Schramm | B60R 11/0264 |
| | | | 280/731 |
| 2016/0205465 A1* | 7/2016 | Slotte | H04M 1/035 |
| | | | 381/349 |
| 2020/0006020 A1* | 1/2020 | Ito | H01H 13/7006 |
| 2020/0409648 A1* | 12/2020 | Katsuyama | H04R 5/02 |

FOREIGN PATENT DOCUMENTS

| | | |
|---|---|---|
| JP | H02-116774 U | 9/1990 |
| JP | H11-027356 A | 1/1999 |
| JP | 2010-244653 A | 10/2010 |
| JP | 2011-165114 A | 8/2011 |
| JP | 2012-253634 A | 12/2012 |

OTHER PUBLICATIONS

International Search Report issued in International Patent Application No. PCT/JP2018/021009, dated Jul. 3, 2018; with English translation.
Writted Opinion of the International Searching Authority, issued in International Patent Application No. PCT/JP2018/021009, dated Jul. 3, 2018; with partial English translation.
Notice of Reasons for Refusal dated Apr. 12, 2022 issued in the corresponding Japanese Patent Application No. 2020-522513, with English translation.

* cited by examiner

*Primary Examiner* — Nader Bolourchi
(74) *Attorney, Agent, or Firm* — Rimon P.C.

(57) ABSTRACT

A vehicle-mounted device includes a switch unit installed in a traveling object and configured to be operated by an occupant; a speaker unit installed on a far side of the switch unit from the occupant; an air chamber installed on a far side of the speaker unit from the occupant; and a substrate provided between the switch unit and the speaker unit and including at least one opening.

8 Claims, 13 Drawing Sheets

FIG.10
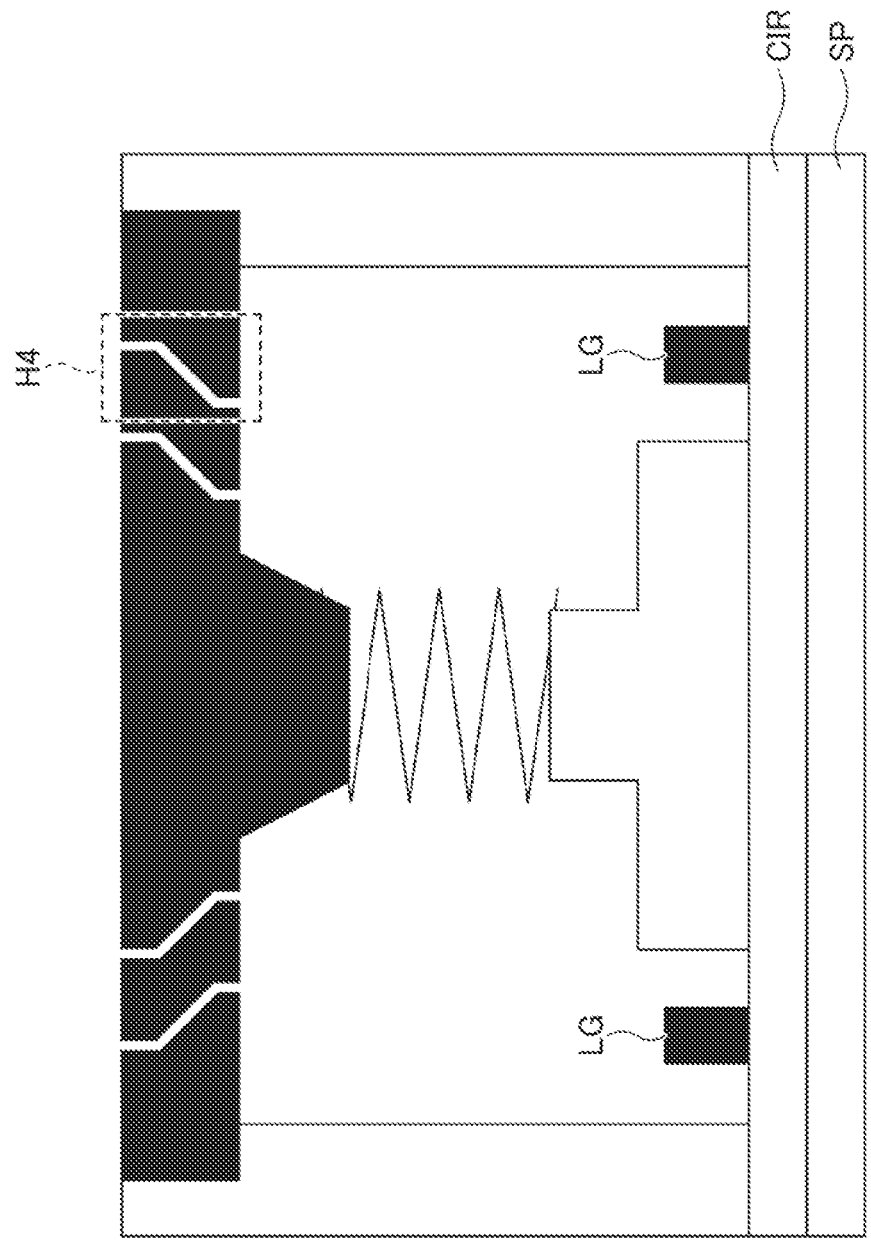
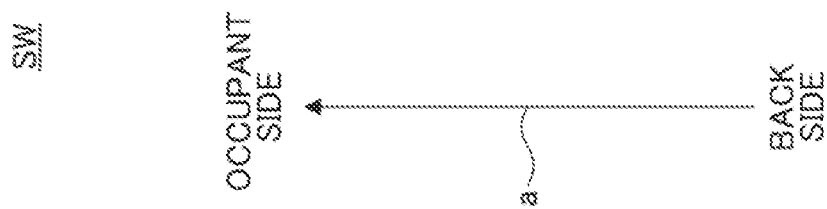

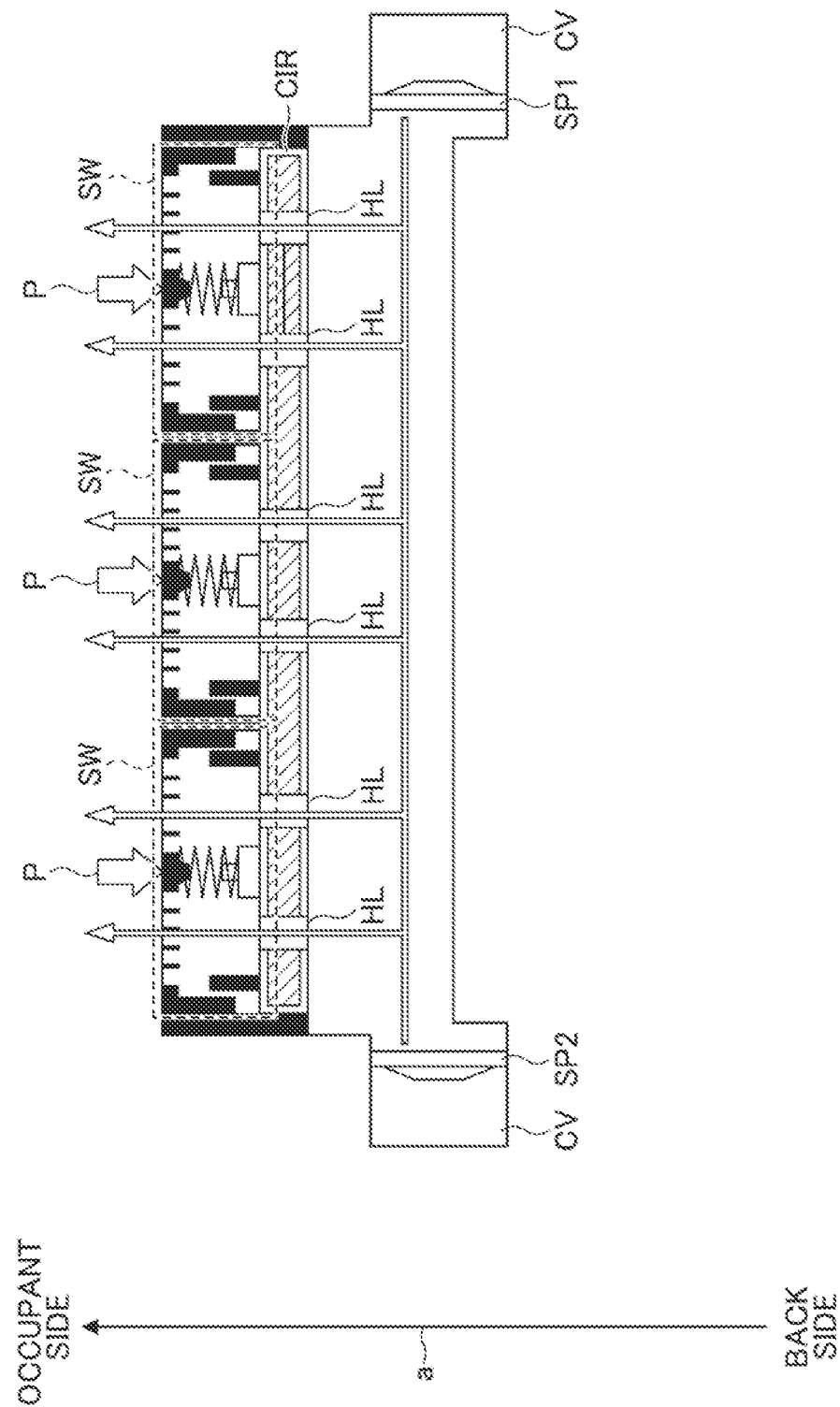

VEHICLE-MOUNTED DEVICE

CROSS-REFERENCE TO RELATED APPLICATIONS

This application is a continuation of International Application PCT/JP2018/021009, filed on May 31, 2018 and designated the U.S., the entire contents of which are incorporated herein by reference.

BACKGROUND OF THE INVENTION

1. Field of the Invention

The present invention relates to a vehicle-mounted device.

2. Description of the Related Art

Conventionally, a technique for providing an acoustic device such as a speaker behind a component such as a switch is known.

Specifically, a disaster prevention device includes a diffusion dome cover and an LED (Light Emitting Diode) that illuminates the diffusion dome cover. Then, the disaster prevention device transmits the message when the pressing member is pressed. Furthermore, the disaster prevention device is provided with a thin film-shaped pressure sensitive switch whose resistance value changes according to the pressing force of the pressing operation in the donut hole of a display lamp. With such a configuration, the disaster prevention device detects the pressing force by the pressure sensitive switch and outputs a pressure sensitive detection signal that changes corresponding to the pressing force. Consequently, for the disaster prevention device, a speaker can be arranged in the speaker storage unit positioned behind the display lamp and the transmitter.

However, for example, in a vehicle-mounted device, when installing a speaker or the like in such as steering wheel, space is often limited. Furthermore, the vehicle-mounted device requires more reliability or the like than such as consumer devices. Therefore, available components for a vehicle-mounted device is limited.

Patent Literature 1: Japanese Patent Application Publication No. 2011-165114

SUMMARY OF THE INVENTION

An object of one aspect of the present disclosure is to install an acoustic device in a small space in a vehicle-mounted device.

According to an embodiment, a vehicle-mounted device includes a switch unit installed in a traveling object and configured to be operated by an occupant; a speaker unit installed on a far side of the switch unit from the occupant; an air chamber installed on a far side of the speaker unit from the occupant; and a substrate provided between the switch unit and the speaker unit and including at least one opening.

According to at least one embodiment, an acoustic device can be installed in a small space in a vehicle-mounted device.

BRIEF DESCRIPTION OF THE DRAWINGS

FIG. 10 is a cross-sectional view illustrating an example of a shape of a hole in the switch unit SW (fifth example) according to the present disclosure;

FIG. 13 is a cross-sectional view illustrating a third alternate embodiment of a vehicle-mounted device according to the present disclosure.

DESCRIPTION OF THE PREFERRED EMBODIMENTS

Figure 1:
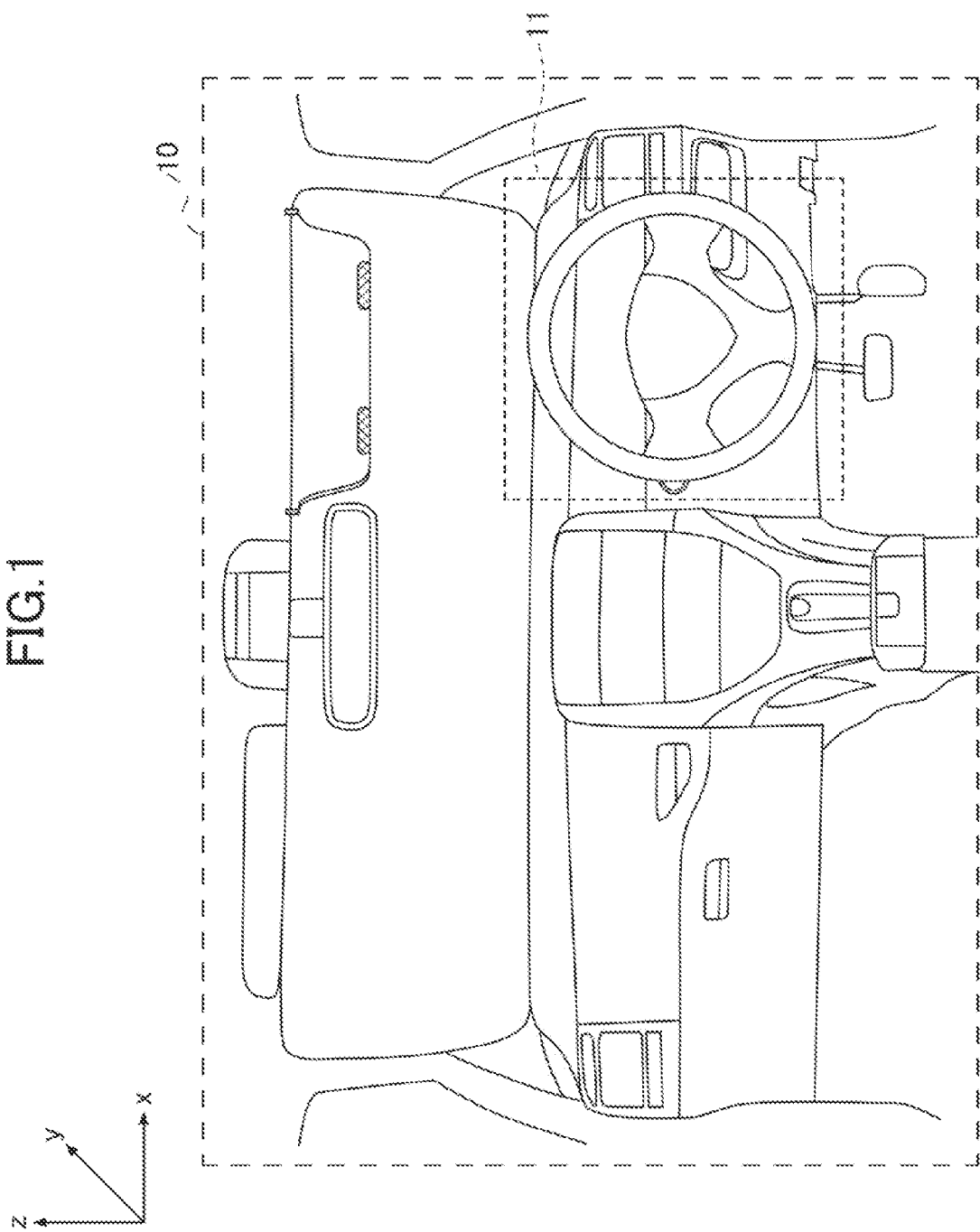
FIG. 1 illustrates an example of the overall configuration using a vehicle-mounted device according to the present disclosure.

Hereinafter, each embodiment will be described with reference to the drawings. Furthermore, in the present description and the drawings, components having substantially the same functional configuration are designated by the same reference numerals and duplicated descriptions will be omitted.

<An Example of an Overall Configuration Using a Vehicle-Mounted Device>

For example, the overall configuration is as follows when the vehicle-mounted device according to the present disclosure is used.

FIG. 1 illustrates an example of the overall configuration using a vehicle-mounted device according to the present disclosure. FIG. 1 illustrates the inside of a vehicle 10, which is an example of a traveling object. The traveling object may have an occupant, and the type is not limited to a vehicle.

Hereinafter, the traveling direction of the vehicle 10 (depth direction in FIG. 1) is referred to as the "y-axis". The horizontal direction (right-hand direction in FIG. 1) orthogonal to the y-axis is defined as the "x-axis". Furthermore, the vertical direction (vertical direction in FIG. 1) vertical to the y-axis is referred to as the "z-axis".

Hereinafter, a case where the vehicle-mounted device is a steering wheel device 11 will be described as an example.

Figure 2:
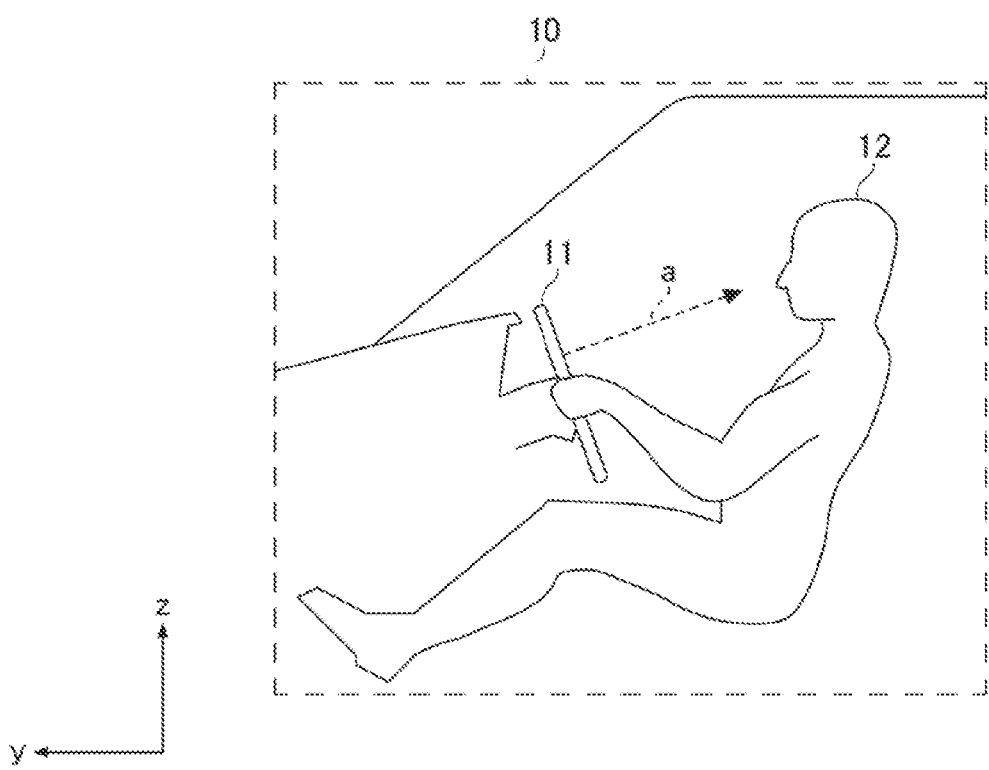
FIG. 2 illustrates an example of the overall configuration using a steering wheel device 11 according the to the present disclosure.

FIG. 2 illustrates an example of the overall configuration using a steering wheel device 11 according to the present disclosure. As illustrated in FIG. 2, an occupant such as a driver 12 operates the traveling direction of the vehicle 10 and the like by using the steering wheel device 11.

Hereafter, as illustrated, the direction toward the occupant is referred to as the "a-axis".

As illustrated, the steering wheel device 11 is a vehicle-mounted device installed at a position close to the driver 12. Furthermore, there are few obstacles that block sound between the steering wheel device 11 and the driver 12. As described above, a vehicle-mounted device is preferably installed at a position where the distance from the person who hears the sound is close and few obstacles exist.

A vehicle-mounted device is not limited steering wheel device 11. For example, a vehicle-mounted device may be a panel part or the like.

Furthermore, for example, in the case that a vehicle-mounted device is a steering wheel device 11, it is preferable that the speaker unit is installed in the following positions.

Figure 3:
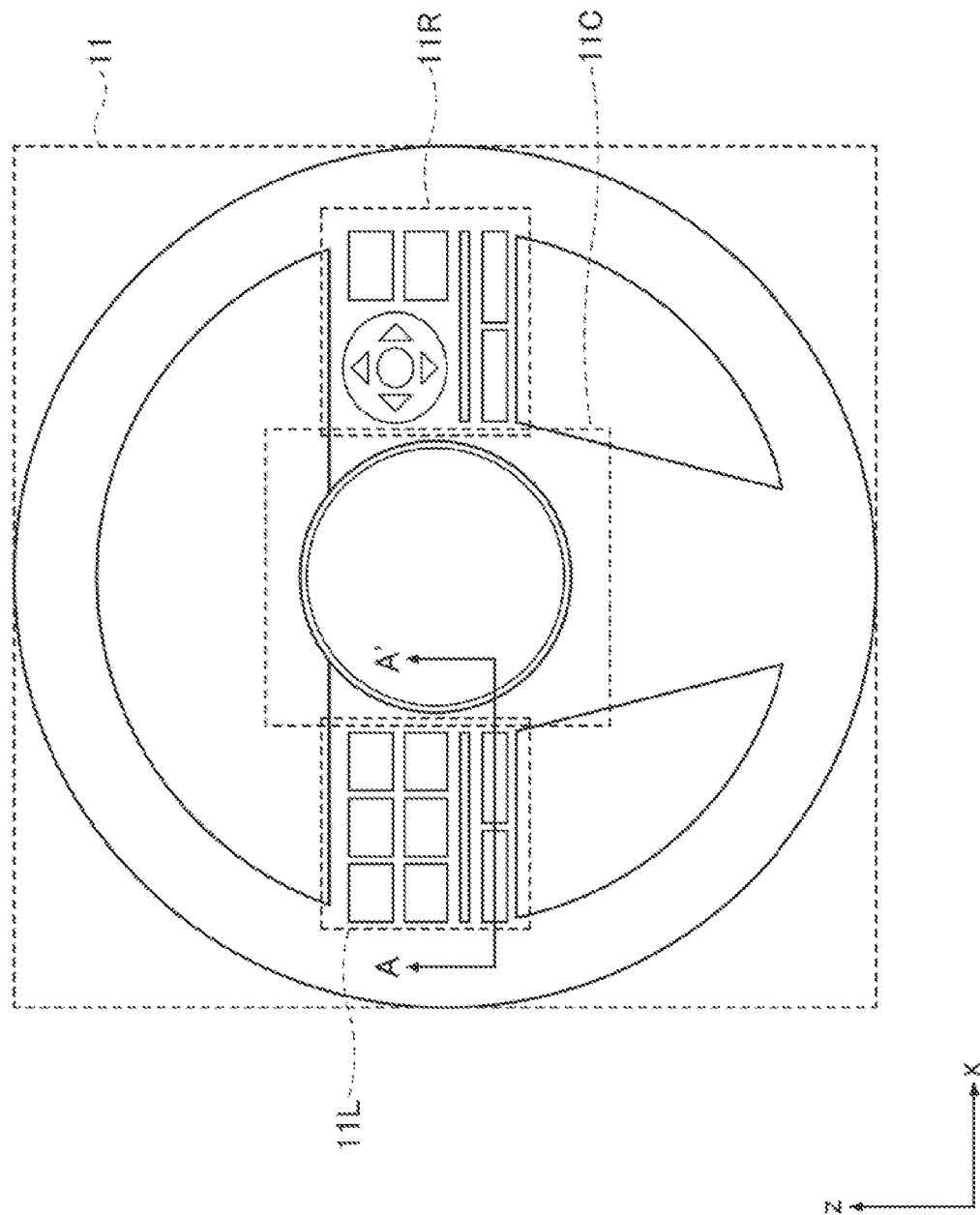
FIG. 3 illustrates an example of a position where a speaker unit is installed in the steering wheel device 11 according to the present disclosure.

FIG. 3 illustrates an example of a position where a speaker unit is installed in the steering wheel device 11 according to the present disclosure. Specifically, it is preferable that the speaker unit is installed at, as illustrated, left side part 11L, right side part 11R, and the like.

A device such as an airbag is often installed at the center part 11C. Accordingly, it is preferable that the speaker unit is installed at a part such as the left side part 11L and the right side part 11R that has little influence on the installation of the airbag or the like.

Furthermore, when a speaker unit SP includes a plurality of speakers which are installed at such as the left side part 11L and the right side part 11R, the vehicle-mounted device can output so-called stereophonic sound. Furthermore, when the speakers are positioned at such as the left side part 11L and the right side part 11R, the speakers are positioned symmetrically with respect to the occupant (in this case, the speakers 11 are installed symmetrically with respect to the center part, as the axis of symmetry, of the steering wheel device 11).

As illustrated, in the case of a switch unit including a plurality of switches, switches are installed in the left side part 11L, the right side part 11R, etc. The occupant inputs an operation for a device included in the vehicle 10 by operating the switch unit. Specifically, the devices included in the vehicle 10 are a car navigation device, an air conditioner device, and the like.

The following is an example to be applied to the left side part 11L.

<Configuration Example of Vehicle-Mounted Device>

Figure 4:
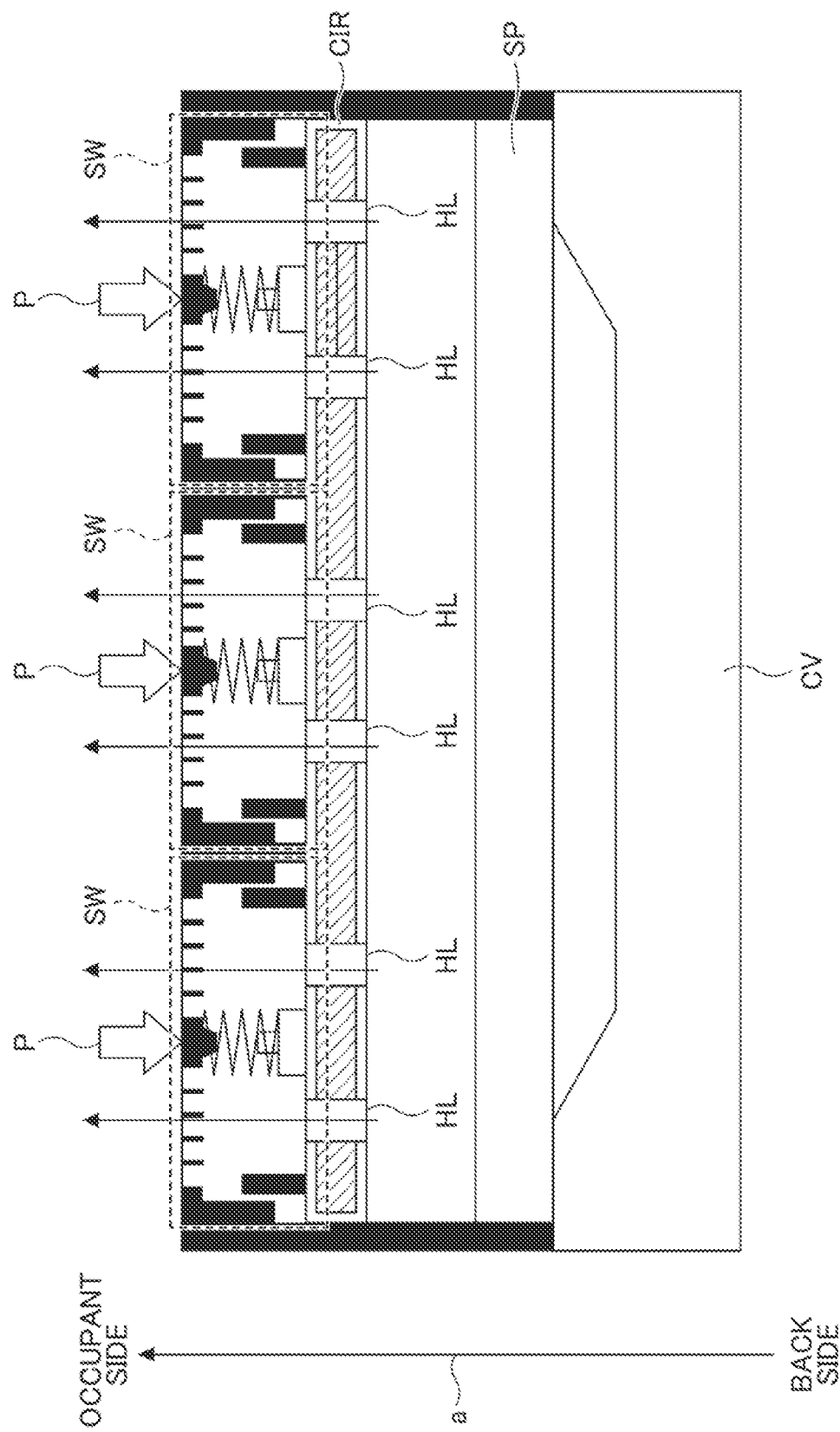
FIG. 4 is a cross-sectional view illustrating a configuration example of a vehicle-mounted device according to the present disclosure.

FIG. 4 is a cross-sectional view illustrating a configuration example of a vehicle-mounted device according to the present disclosure. FIG. 4 is a cross-sectional view of A-A' of FIG. 3. The illustrated example is an example in which there are three switches SW. Hereinafter, an example of switches SW having the same structure will be described. Meanwhile, if a switch unit includes a plurality of switches SW, each switch SW may have a different structure.

As illustrated, a switch unit SW detects that the surface is pressed. For example, when a pressing operation P is performed by an occupant, the switch unit SW detects the pressing operation. Specifically, when the pressing operation P is performed the substrate CIR outputs a signal indicating the detection result to the external device.

Furthermore, as illustrated, the substrate CIR is provided between the switch unit SW and the speaker unit SP. Also, as illustrated, the substrate CIR includes an opening HL. By including an opening HL, as illustrated, the sound outputted from the speaker unit SP may be transmitted to the occupant adequately. In other words, in the illustrated configuration, the sound outputted from the speaker can be transmitted to the occupant adequately even if the speaker unit SP is installed on the back side of the switch unit SW.

Furthermore, in the illustrated configuration, an air chamber CV may be installed on the back side of the speaker unit SP. Furthermore, it is preferable that the air chamber CV has a structure in which the sound outputted from the back side of the speaker unit SP does not appreciably escape and does not appreciably interfere with the sound outputted from the front side of the speaker unit SP. By including such an air chamber CV, particularly a low-pitched sound can be enhanced.

Furthermore, the larger the air chamber CV is, the more the sound quality of the sound outputted from the speaker unit SP can be improved. Therefore, it is preferable that the air chamber CV secures a necessary and sufficient volume that matches the characteristics of the mounted speaker. For example, it is preferable that the volume V of the air chamber CV is not less than that calculated with the method of calculating the volume of the sealed enclosure in the following formula (1).

[Formula 1]

$$V = \frac{355 \times r^4}{\alpha \times f_0^2 \times m_0} \quad (1)$$

$$\alpha = \left(\frac{Q_{0c}}{Q_0}\right)^2 - 1$$

Volume of the air chamber CV: V unit L (liter)
Lowest resonance frequency: $f_0$ unit Hz (hertz)
Sharpness of resonance: $Q_0$
Equivalent mass: $m_0$ unit g (gram)
Effective radius of oscillation: r
Elevated value by air spring force $Q_0$: $Q_{0c}$ In Formula (1), the lowest resonance frequency is the lowest frequency in the frequencies at which the oscillation system resonates.

Furthermore, in Formula (1), the sharpness of resonance is an index showing the sharpness of resonance at the lowest resonance frequency. Accordingly, when the sharpness of resonance is large, a low-pitched sound is easily generated and underdamping easily occurs. Therefore, the sharpness of resonance is preferably a value of "1" or less.

Furthermore, in Formula (1), the equivalent mass is the mass of the oscillating portion.

Furthermore, in Formula (1), the effective radius of oscillation is the radius of the portion that moves to generate sound. Therefore, the effective radius of oscillation may include an edge or the like.

Furthermore, "α" in Formula (1) may be called an internal volume coefficient. For example, as shown in Formula (1), "α" is a value calculated by subtracting "1" from the value obtained by squaring the increase ratio.

In addition, as illustrated, it is preferable that one speaker unit SP is installed for a plurality of switch units SW. Specifically, in the illustrated example, one speaker unit SP is installed for three switch units SW. This configuration allows a large speaker unit SP to be installed.

A large speaker unit SP can output higher quality sound than a small speaker unit. Especially, the large speaker unit. SP can output high quality sound in a low-pitched sound range. Furthermore, it is preferable that the diameter of the large speaker unit SP is about 20 mm (millimeter) or more.

<An Example of the Switch Unit>

The switch unit preferably includes a hole through which sound can pass.

Figure 5:
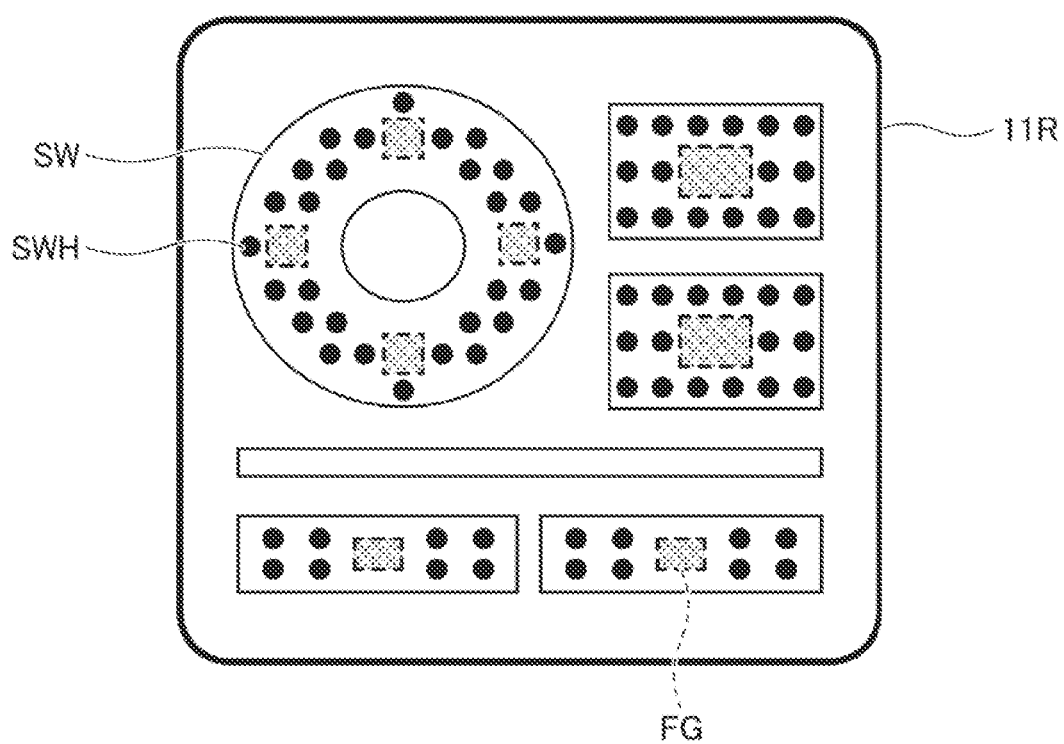
FIG. 5 is a plan view illustrating a configuration example of a vehicle-mounted device according to the present disclosure.

FIG. 5 is a plan view illustrating a configuration example of a vehicle-mounted device according to the present disclosure. For example, as illustrated, it is preferable that the hole SWH is arranged with avoiding the pattern FG drawn on the switch unit SW. Furthermore, the number of holes SWH is not limited to the number illustrated in FIG. 5. Therefore, the number of holes SWH may be larger or smaller than the number illustrated in FIG. 5. For example, the hole SWH may be provided at a position other than illustrated in FIG. 5.

For example, the diameter of the hole SWH may be 1.0 mm (millimeter) to 2.0 mm. However, in order to avoid the hole SWH being conspicuous, the diameter may be around 0.8 mm.

The hole SWH preferably is formed in the following shape.

Figure 6:
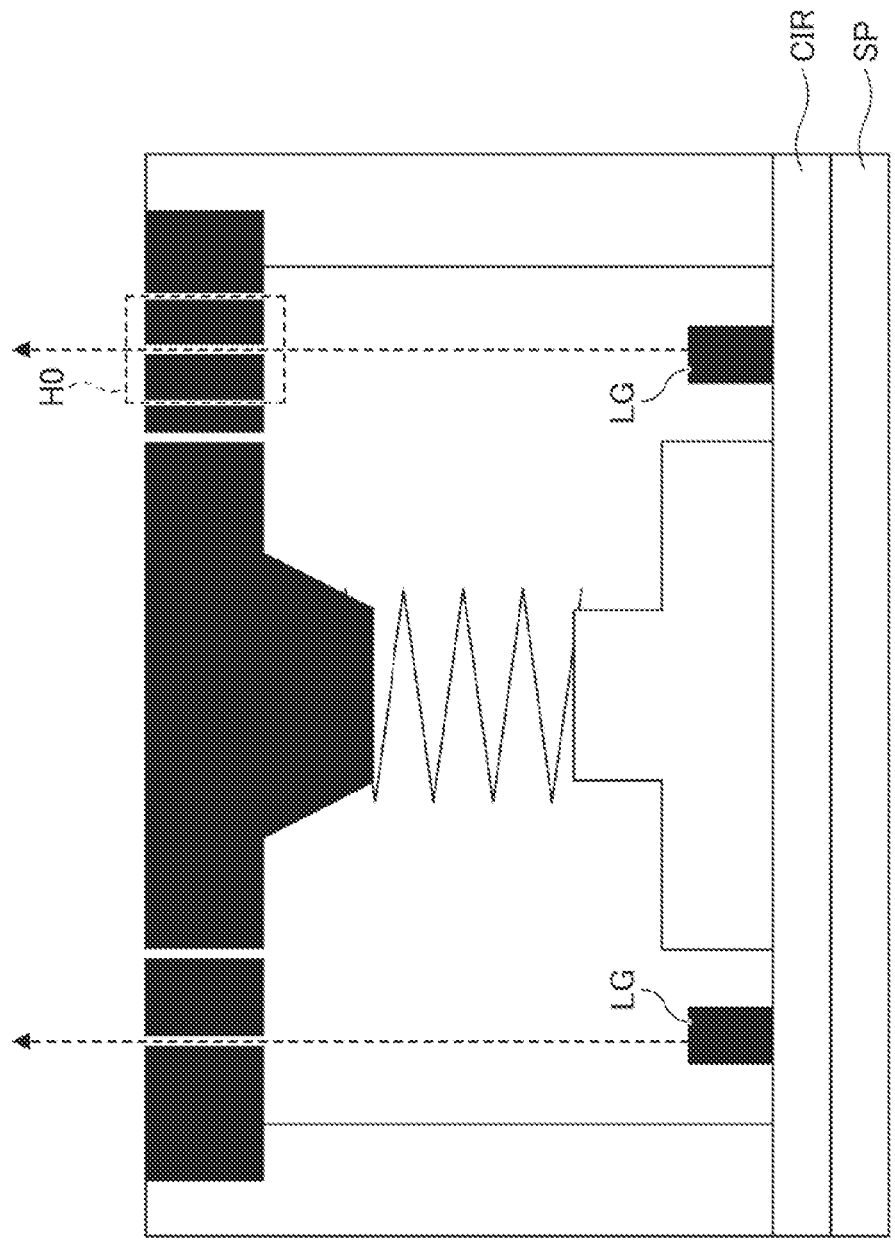
FIG. 6 is a cross-sectional view illustrating an example of a shape of a hole in the switch unit SW (first example) according to the present disclosure.

FIG. 6 is a cross-sectional view illustrating an example of a shape of a hole in the switch unit SW (first example) according to the present disclosure. For example, it is preferable that the switch unit SW includes a hole H0 as illustrated. Furthermore, it is more preferable that the hole H0 has a size such that water, dust, and the like cannot pass through. In addition, for example, it is more preferable that the hole is formed in the following shape.

Figure 7:
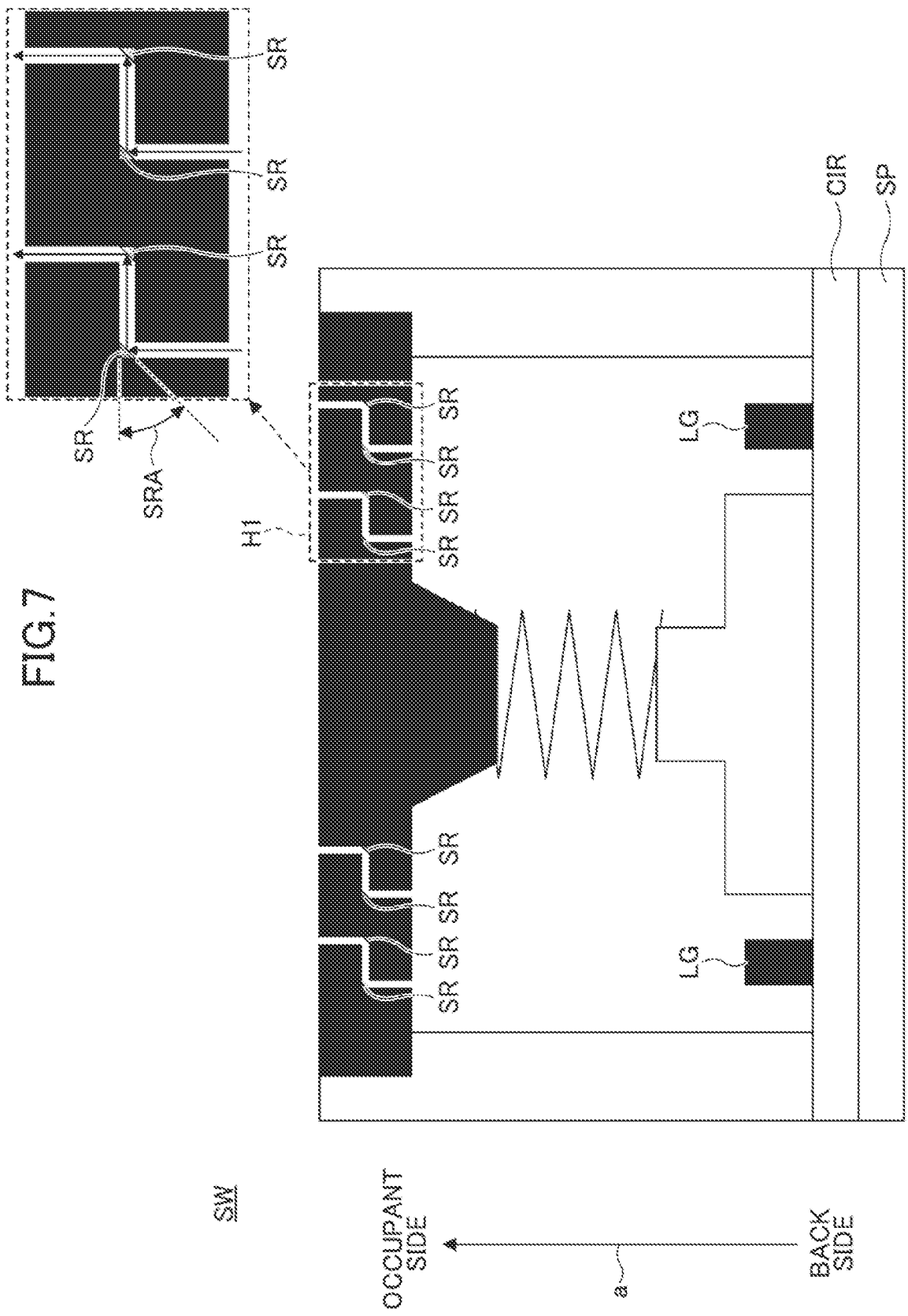
FIG. 7 is a cross-sectional view illustrating an example of a shape of a hole in the switch unit SW (second example) according to the present disclosure.

FIG. 7 is a cross-sectional view illustrating an example of a shape of a hole in the switch unit SW (second example) according to the present disclosure. For example, it is preferable that the switch unit SW includes a hole H1 as illustrated.

As illustrated, it is preferable that the hole H1 is a non-linear shape in the direction toward the occupant. Specifically, the hole H1 includes a portion that is substantially right-angled in the direction toward the occupant. If the hole H1 is formed in a non-linear shape, water, dust and the like can be prevented from infiltrating the inside of ole switch unit SW from the outside.

In addition, a non-linear shape such as a hole H1 prevents an occupant from feeling glare from the illumination light. For example, as illustrated, the switch unit SW often includes a lighting device LG such as an LED or a light bulb. In a dark environment such as at night, the lighting device LG is turned on. When the lighting device 10 is turned on, the occupant can identify the position or type of the switch unit SW even in a dark environment. On the other hand, when the light emitted from the lighting device LG reaches the occupant directly, the occupant easily feels glare. Therefore, if the light emitted from the lighting device LG reaches the occupant directly, it may hinder driving or the like.

In consideration of the above, if the hole has a non-linear shape as the hole H1 illustrated in FIG. 7, the sound can pass through, but the illumination light can be prevented from reaching the occupant directly.

Furthermore, as illustrated, it is preferable that a reflector SR is installed in the hole H1. For example, as illustrated, the reflector SR is installed at a corner part or the like. Furthermore, it is preferable that the reflector SR is installed so as to the installation angle SRA to be about 45°, or it is preferable that the shape of the reflector is formed such that the installation angle SRA is about 45°. A sound can easily pass through with such an installation angle SRA.

On the other hand, without the reflector SR, the sound may be reflected and returned to the sound source (the speaker unit SP in the illustrated example). In consideration of the above, by installing the reflector SR, the reflection of sound that returns to the sound source can be reduced.

Furthermore, it is preferable that the reflector SR does not reflect much light. Therefore, for example, the reflector SR is preferably a color or a material not appreciably reflecting light. Furthermore, the reflector SR is preferably made of a material such as plastic, iron, or aluminum. That is, the reflector SR is preferably made of a material which easily reflects sound with a hard and smooth surface, such as plastic, iron, or aluminum. As described above, it is preferable that sound easily passes through the hole H1, while light or the like does not appreciably pass through. In consideration of the above, if the reflector SR is a black color or the like absorbing light, the hole H1 can be formed in which sound easily passes through and light or the like does not appreciably pass through.

Furthermore, the reflector SR may not be a separate member. In other words, the reflector SR may be integrated with the hole H1 or may be installed as a separate member as illustrated. Furthermore, the position of installation, the number of installations, and the installation angle of the reflector SR are not limited to the illustrated configuration.

For example, the non-linear shape may be as follows.

Figure 8:
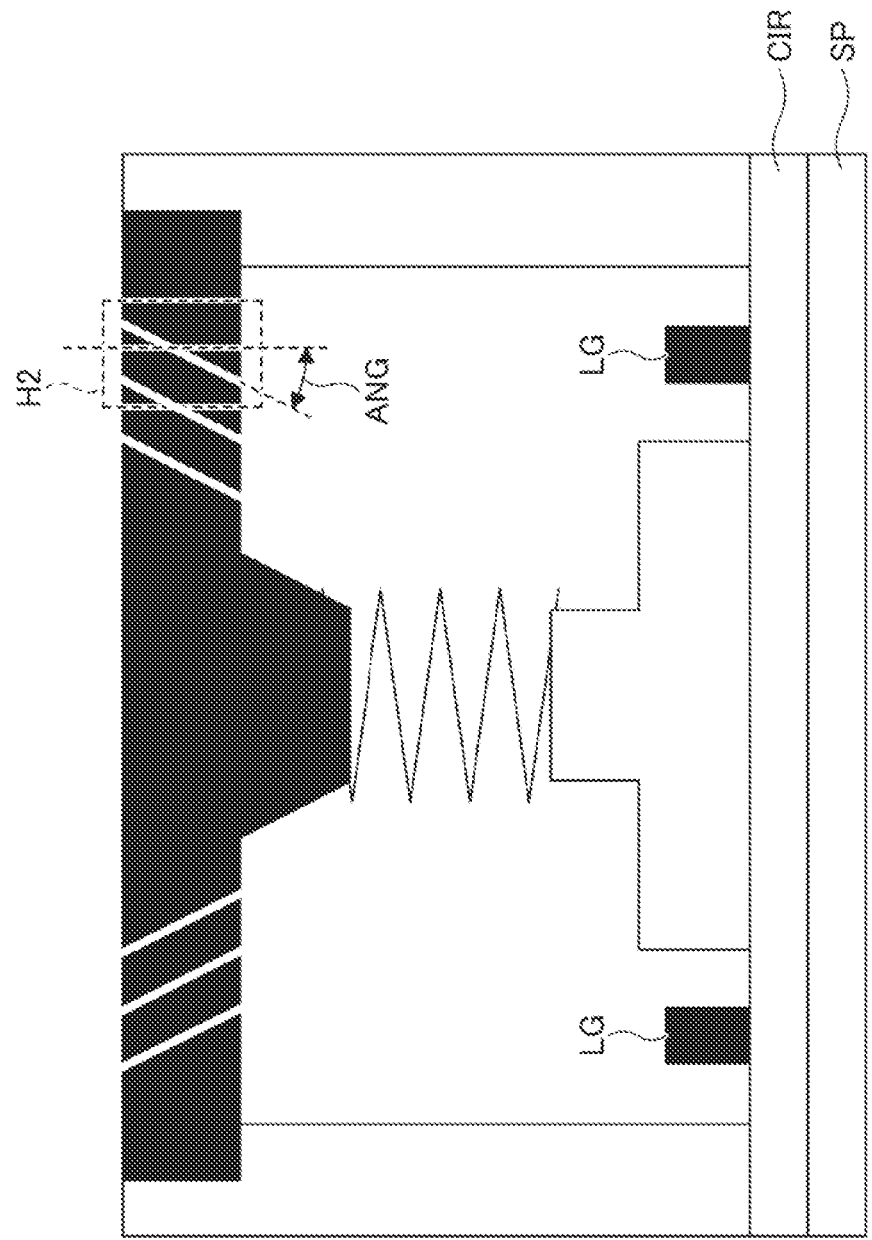
FIG. 8 is a cross-sectional view illustrating an example of a shape of a hole in the switch unit SW (third example) according to the present disclosure.

FIG. 8 is a cross-sectional view illustrating an example of a shape of a hole in the switch unit SW (third example) according to the present disclosure. FIG. 8 illustrates a different shape of the hole H2 compared to FIG. 7.

As illustrated, the hole H2 may be an oblique shape with a predetermined angle ANG with respect to the direction toward the occupant. Even in such a shape, water, dust and the like can be prevented from infiltrating the inside of the switch unit SW from the outside.

Furthermore, the angle ANG is an angle such that the light of the internal illumination does not reach by reflection due to surface processing of the inside of the hole. For example, the angle ANG is about 30° to 60°.

For example, the non-linear shape may be as follows.

Figure 9:
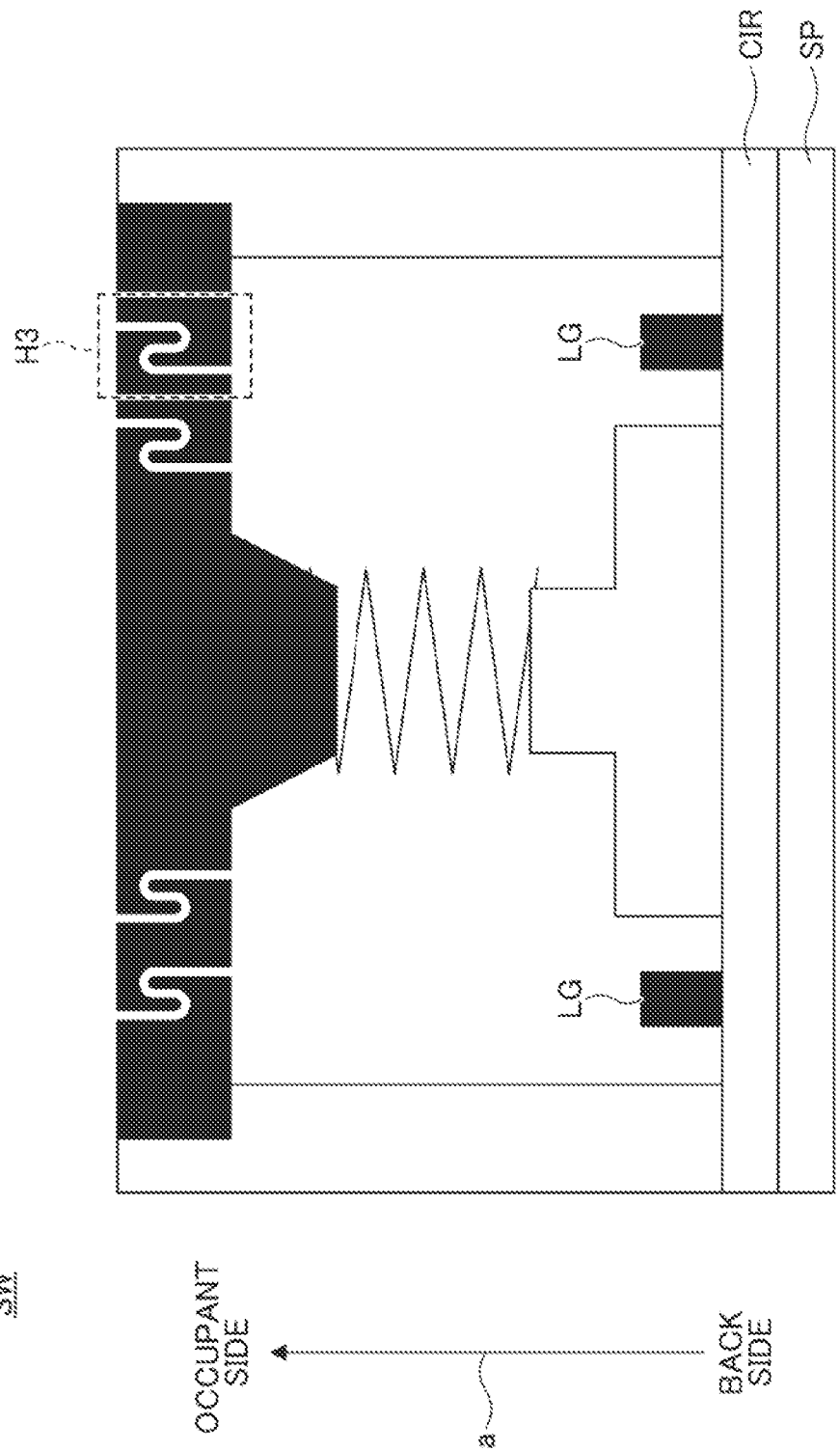
FIG. 9 is a cross-sectional view illustrating an example of a shape of a hole in the switch unit SW (fourth example) according to the present disclosure.

FIG. 9 is a cross-sectional view illustrating an example of a shape of a hole in the switch unit SW (fourth example) according to the present disclosure.

For example, as illustrated, the hole H3 may have a shape with curvature. Even an such a shape, water, dust, and the like can be prevented from infiltrating the inside of the switch unit SW from the outside.

In addition, for example, the non-linear shape may be as follows.

FIG. 10 is a cross-sectional view illustrating an example of a shape of a hole in the switch unit SW (fifth example) according to the present disclosure. For example, as illustrated, the shape of the hole H4 may be a combination of a straight line in the direction toward the occupant and an oblique line will a predetermined angle with respect to the direction toward the occupant. Even in such a shape, water, dust and the like can be prevented from infiltrating the inside of the switch unit SW from the outside.

Alternate Embodiments

For example, the vehicle-mounted device may be configured as follows.

Figure 11:
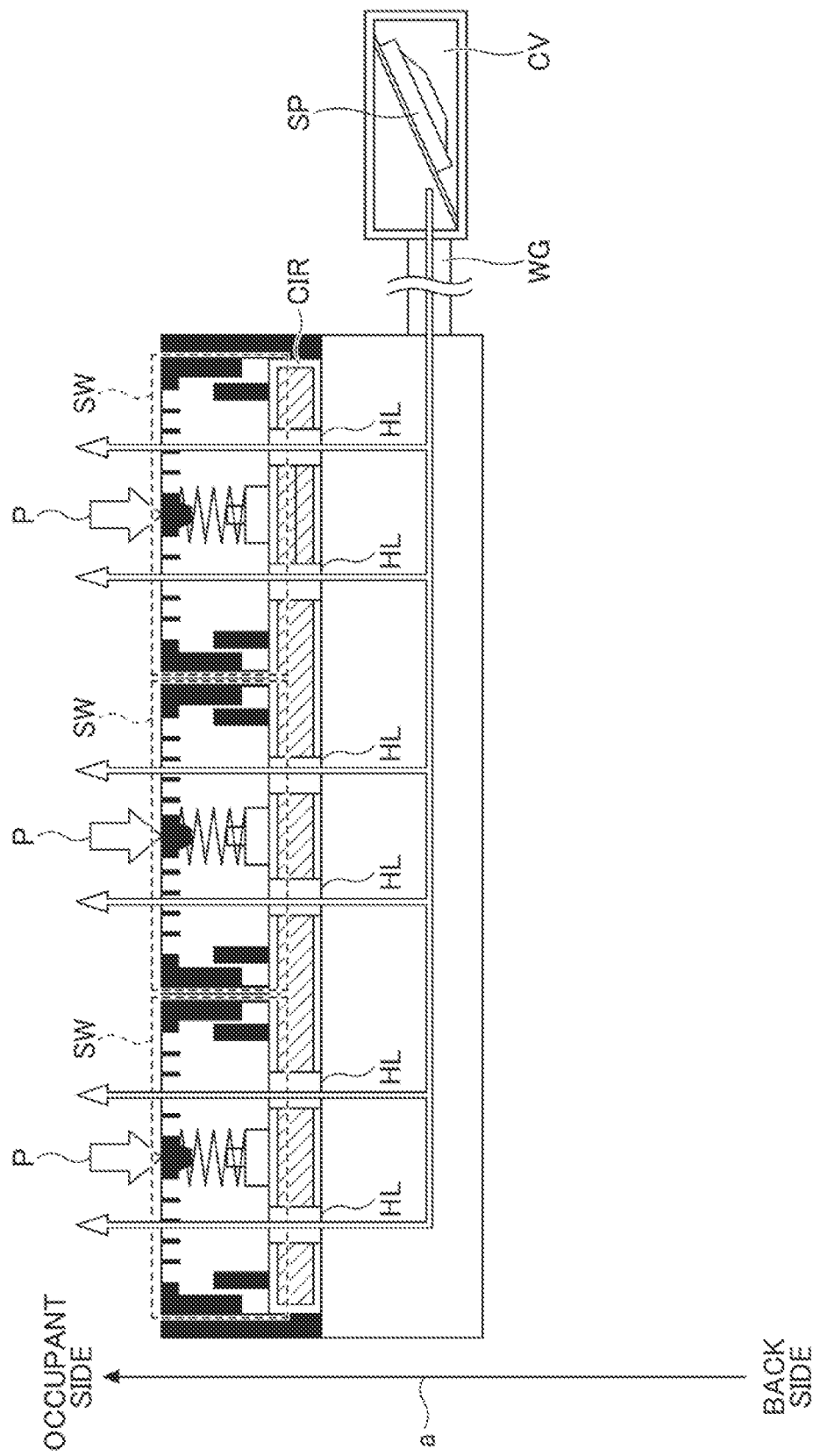
FIG. 11 is a cross-sectional view illustrating a first alternate embodiment of a vehicle-mounted device according to the present disclosure.

FIG. 11 is a cross-sectional view illustrating a first alternate embodiment of a vehicle-mounted device according to the present disclosure. The speaker unit SP does not have to be positioned directly behind the switch unit SW as illustrated in FIG. 4.

Specifically, as illustrated, the speaker unit SP may be connected by a waveguide WG. In the illustrated configuration, the sound outputted from the speaker unit SP is transmitted via the waveguide WG. Even in such a configuration, sound can be outputted similarly to the configuration of FIG. 4.

Furthermore, this configuration allows the space on the back side of the switch unit SW to be smaller. The position of the waveguide WG and the speaker unit SP may be different from the illustrated position.

Furthermore, the vehicle-mounted device may be configured as follows.

Figure 12:
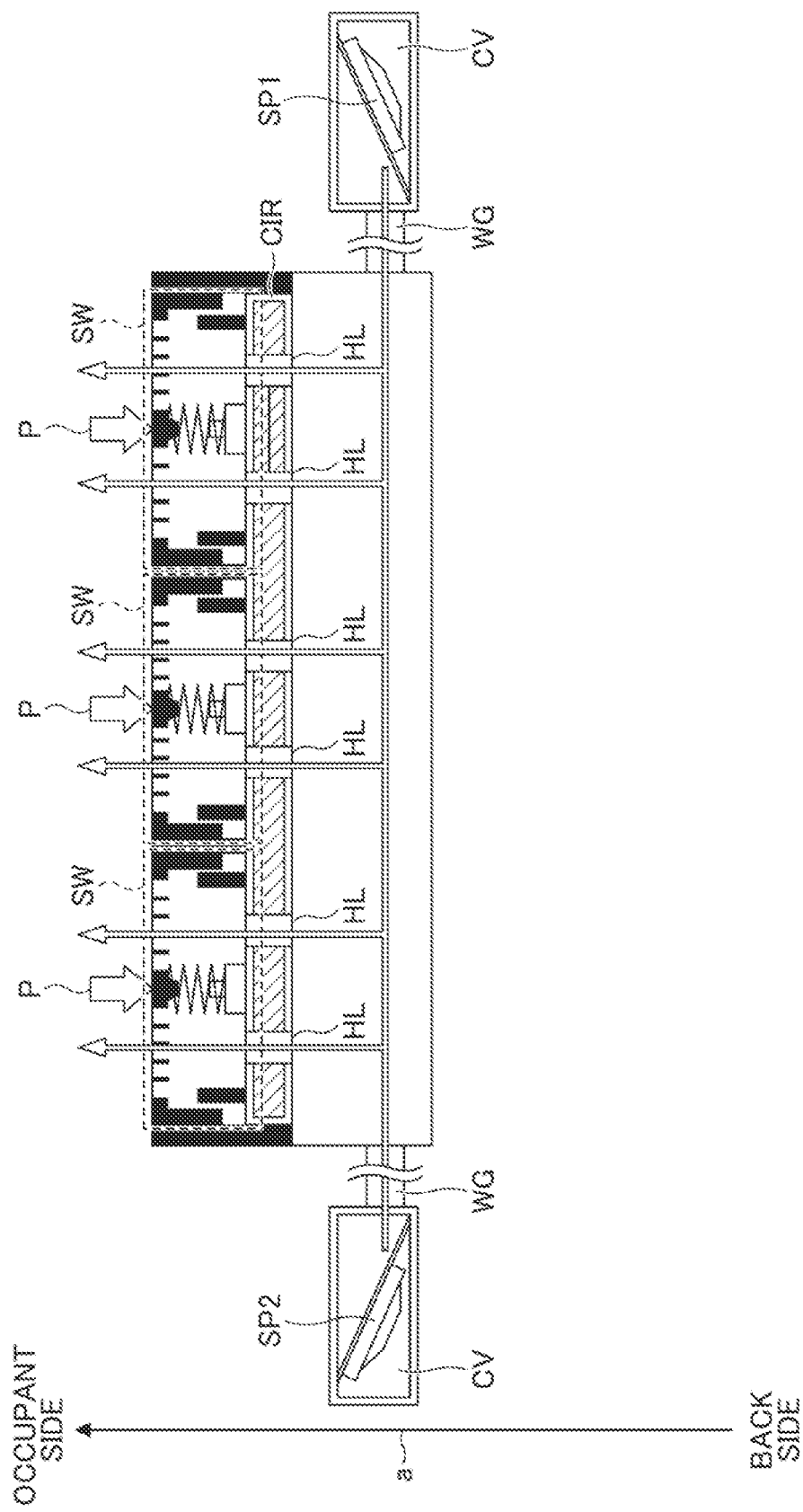
FIG. 12 is a cross-sectional view illustrating a second alternate embodiment of a vehicle-mounted device according to the present disclosure.

FIG. 12 is a cross-sectional view illustrating a second alternate embodiment of a vehicle-mounted device according to the present disclosure.

A vehicle-mounted device illustrated in FIG. 12 includes a speaker SP1 and a speaker SP2. The vehicle-mounted device illustrated in FIG. 12 is different from the first alternate embodiment in that the plurality of speakers are provided. Even in such a configuration, the space on the back side of the switch unit SW can be made smaller. Also, since the effective oscillation radius r is doubled by the two speakers driven by the same phase, a sound with a higher sound pressure can be output.

The number of speakers may be three or more. Furthermore, the position of the waveguide WE and the speaker unit SP may be different from the illustrated position.

Furthermore, the vehicle-mounted device may be configured as follows.

FIG. 13 is a cross-sectional view illustrating a third alternate embodiment of a vehicle-mounted device according to the present disclosure. In the illustrated example, the arrangement of the speaker SP1 and the speaker SP2 is different from that of the second alternate embodiment. Accordingly, the speaker SP1 and the speaker SP2 may be in the arrangement as illustrated.

Even in such a configuration, the space on the back side of the switch unit SW can be made smaller. Also, for example, if the speaker SP1 and the speaker SP2 are driven by the same phase, a sound with a higher sound pressure can be output, similar to the second alternate embodiment, since the effective oscillation radius r is doubled.

<Summary>

As is clear from the previous description, the steering wheel device 11 according to the embodiment includes a switch unit SW and a speaker unit SP, and the speaker unit SP is installed on the back side of the switch unit SW. And, a substrate CIR is provided between the switch unit SW and the speaker unit SP and includes at least one opening.

The above configuration allows the speaker unit SP to be installed under the switch unit SW. Therefore, the speaker unit SP can be mounted on the steering wheel or the like without designing to reduce the switch unit SW.

In the vehicle-mounted device, space is often limited. Particularly, the steering wheel device 11 often has the switch unit SW mounted on the entire surface thereof. Accordingly, it is difficult to separately secure a space for mounting the acoustic hole and the acoustic device. On the other hand, according to the configuration of an embodiment of the present disclosure, the speaker unit SP and the like can be installed, that is, the acoustic device can be installed in a small space in the vehicle-mounted device.

Particularly, according to the configuration of an embodiment of the present disclosure, a large speaker unit SP can be installed easily. Therefore, an acoustic device which is able to output particularly the low-pitched sound with high quality can be installed in the vehicle-mounted device.

The standards of the vehicle-mounted device differ from general audio equipment. That is, the vehicle-mounted device is not easily implemented unless it is a component that has passed a strict reliability test or the like, compared to so-called office equipment and general household equipment. Therefore, an embodiment according to the present disclosure may be implemented as a vehicle-mounted component or the like.

Note that the present disclosure is not limited to the configurations and the like described above. That is, the embodiments can be modified and added without departing from the purpose of the present disclosure, and can be appropriately determined according to the application form.

What is claimed is:

1. A vehicle-mounted device, comprising:
a switch unit installed in a traveling object and configured to be operated by an occupant;
a speaker unit installed on a far side of the switch unit from the occupant;
an air chamber installed on the far side of the speaker unit from the occupant; and
a substrate provided between the switch unit and the speaker unit and including at least one opening,
wherein the switch unit includes at least one hole, and
the hole has a straight portion and an oblique portion connected to the straight portion, the straight portion extending in a direction toward the occupant, the oblique portion having a predetermined angle with respect to the direction toward the occupant.

2. The vehicle-mounted device according to claim 1, wherein the switch unit includes a plurality of switches, and the speaker unit is a single speaker provided with respect to the plurality of switches.

3. The vehicle-mounted device according to claim 1, wherein the speaker unit includes a plurality of speakers.

4. The vehicle-mounted device according to claim 1, wherein the vehicle-mounted device is a steering wheel device.

5. The vehicle-mounted device according to claim 1, wherein the hole includes a corner part.

6. The vehicle-mounted device according to claim 5, further comprising a sound reflector installed at the corner part of the hole, wherein the sound reflector is configured to reflect sound.

7. The vehicle-mounted device according to claim 1, further comprising a sound reflector installed in the hole, wherein the sound reflector is configured to reflect sound.

8. The vehicle-mounted device according to claim 1, wherein the hole has a shape with curvature.

* * * * *